Patented Feb. 9, 1943

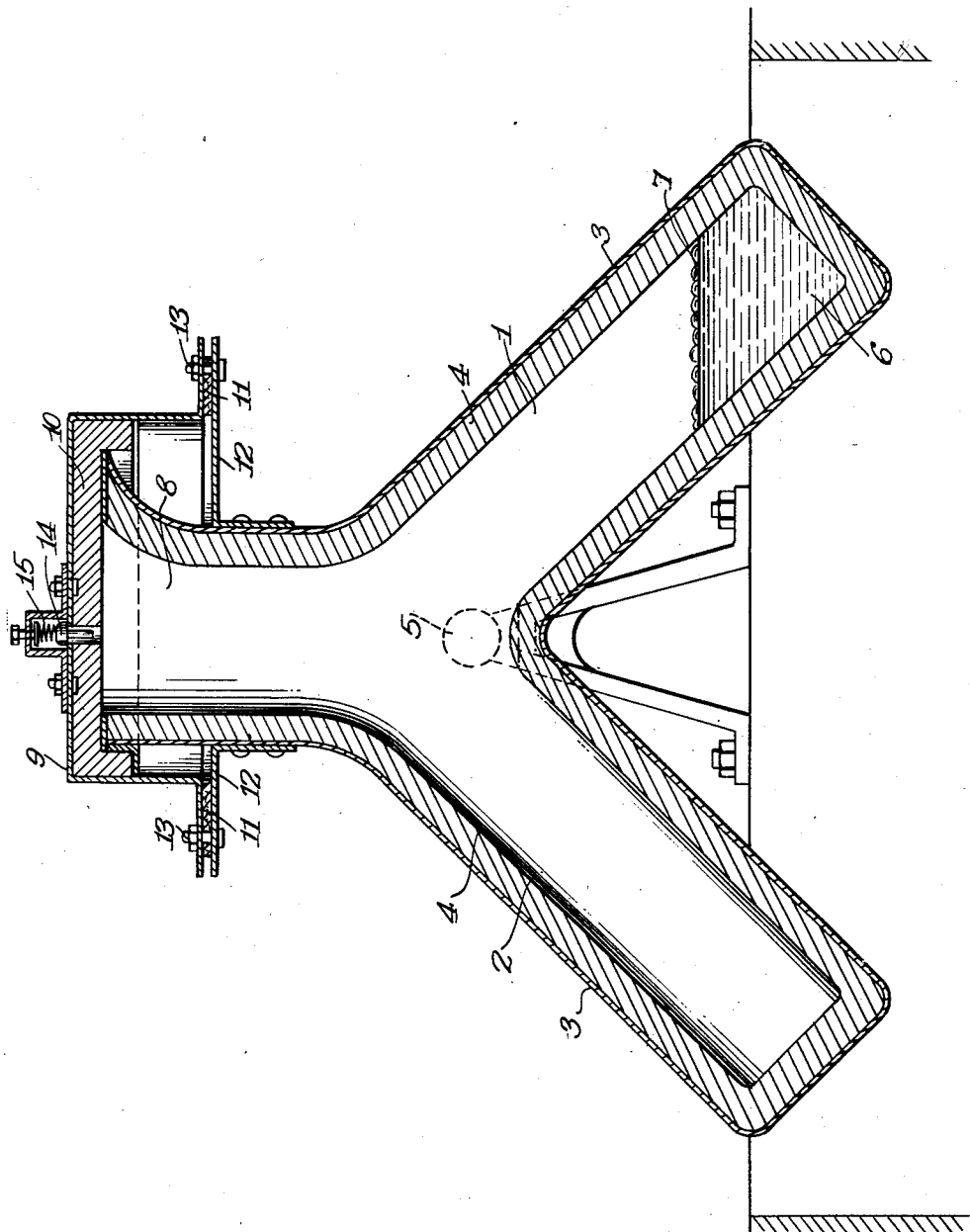

2,310,865

UNITED STATES PATENT OFFICE 2,310,865

PROCESS FOR EFFECTING METALLURGICAL REACTIONS REGULARLY AND RAPIDLY

René Perrin, Paris, France; vested in the Alien Property Custodian

Application March 23, 1938, Serial No. 197,725
In France March 26, 1937

1 Claim. (Cl. 75—54)

The present invention has for subject a process for effecting determined metallurgical reactions regularly from one operation to another, in general reactions between a metal and a slag such as are found in particular in operations of refining by oxidation, removal of silicon, dephosphorization, desulphuration or even deoxidation of a metal, regeneration of a slag, or formation of alloys, etc.

It is known that in metallurgical furnaces in which reactions between a metal and slag are usually effected, the atmosphere of the furnaces has, in many cases, a considerably disturbing effect. It is thus, for example, that in electric furnaces utilised in the metallurgy of steel, the atmosphere of the furnace always intervenes to a more or less considerable extent as an oxidising agent for the bath. Similarly, in reverbatory furnaces utilised for the fusion of cuprous metals, the atmosphere of the furnace always influences in a perceptible way the results obtained in the final metal according as to whether it is during the operation, oxidising or reducing.

It is known, on the other hand, that a large number of metallurgical reactions, and in particular those which give rise to evolution of gas, are influenced to a considerable extent, not only by the nature of the gases present in the furnaces, but also by their pressure. Thus, for example, in the refining of cast iron the pressure of the atmosphere above the bath plays a very important part in the elimination of carbon monoxide.

Now, in furnaces in general, it is very difficult to act effectively upon the atmosphere inside the apparatus, in view of the fact that this atmosphere is formed principally by the combustion gases thus depends essentially on the fuels used. Electric furnaces exist, it is true (high frequency furnaces), which permit vacuum to be produced, or the desired atmosphere to be introduced, but apart from considerable complications which such furnaces present, it is impossible to effect therein reactions of sufficient rapidity to be able to omit heating.

The process which forms the subject of the present invention has for an object the obtaining of determined regular and very rapid metallurgical reactions between the reactants, for example between a metal and a slag, while controlling or regulating these reactions by carrying them out in an atmosphere the composition or pressure, or both composition and pressure, of which are controlled.

The invention consists essentially for this purpose in regulating at will the composition and/or the pressure of the gaseous phase in the presence of which the operation is performed, and to ensure at the same time an agitation or a partial or total mixture of the reactants so as to obtain very rapidly a reaction carried out to the desired degree, without necessarily having to make use of the application of external heat.

In particular, in the case of reactions accompanied by gaseous evolution there may be effected, according to the invention, an adjustment of the pressure of the gaseous phase; for example, by reducing the pressure of this phase to the desired degree, and adjustment of the composition of the said gaseous phase, for example, by introducing gases thereinto so that with the assistance of a sufficiently vigorous agitation the reaction takes place rapidly in the sense and to the degree desired.

The present invention aims more particularly at the application of these means to the effecting of extremely rapid metallurgical reactions, in general between metal and slag, permitting the operator to be completely free from long operations of ordinary metallurgical furnaces and, likewise, from the necessity of application of heat, in particular external heat.

With this object I have applied my general process for the obtaining of very rapid metallurgical reactions, in particular between a metal and a slag, this process consisting essentially in effecting a violent intermixing of a bath of metal with a slag—or its constituents—so as to obtain a fine division of the slag and its dispersion in the form of a sort of emulsion in the bath of metal, with the accompaniment of a strong turbulence of the intimate mixture of metal and slag; such a violent intermixing may, for example, be effected by violently pouring, for example, in a massive jet and from a height the metal into this slag placed at the bottom of a ladle or other like receptacle.

Another operative method to effect such a violent metal-slag intermixing consists as has been described in my French specification No. 780,125 in projecting from one chamber to another backwards and forwards preferably in one or more large jets, the whole of the mass of metal and slag with such violence that under the effect of the vigorous force communicated to the metal and to the slag or to the metal alone, there is, at least partially, division and dispersion of the slag in the metal, the operation being, if necessary, repeated rapidly a number of times sufficient for the reaction to be complete in a relatively very short time.

There has likewise been described in the French patent mentioned above an apparatus suitable for the application of the process in question and consisting, for example, of two chambers opposed mouth to mouth and mounted upon a common transverse axis of rotation, the assembly being provided with actuating means which allow a rapid rocking movement or continuous or intermittent rotation to be imparted to it so as to empty rapidly alternately and successively the two chambers one into the other.

According to the present invention ultra-rapid reactions may also be effected in an apparatus of this kind by eliminating the disturbing influence of the gaseous phase inside the apparatus by the extremely simple means which consists as indicated above, in regulating at will the composition and/or the pressure of the said gaseous phase and in establishing as rapidly as possible a state of equilibrium between the reactants, in general a metal and a slag, this slag or its constituents being introduced into the apparatus in the liquid state or, if desired, partly or wholly in the solid state.

For this purpose, the aperture of the apparatus will be provided with a gas-tight cover and the metal and the slag or its constituents which are desired to react upon one another will be introduced into the apparatus, then the said cover is closed and then there will be imparted the number of oscillations or rotations necessary to intermix violently the metal and the slag. During this time the metal and the slag are completely protected from the outer atmosphere. The atmosphere existing at the moment of closing only will be capable of acting, but it will always be easy to determine the total volume of the apparatus with respect to the quantity of metal and of slag to be treated so that the atmosphere existing in the apparatus at the moment of its closing is proportionately too small for its action to be considerable and, in any case, this action will be always exactly the same from one operation to another.

The pressure inside the apparatus is capable of varying to a considerable extent during the operation, according to the nature of the reactions which are produced between metal and slag.

If the initial atmosphere in the apparatus is air and if one proceeds to an operation such as deoxidation of a metal with the aid of deoxidising slag, for example, the pressure will diminish in general because the oxygen will tend to be absorbed. If the chemical reaction between slag and metal gives rise to an evolution of gas, the pressure will, on the contrary, tend to increase in the apparatus. It should be noted that the reaction giving rise to the evolution of gas or to the absorption of gas will be stopped when the pressure inside the apparatus reaches the value for which equilibrium will have been reached between this pressure and the pressure of formation or of absorption of the gas for the temperature considered.

There may be produced moreover between metal and slag several reactions some giving rise to the evolution of gas and the others not giving rise thereto. These latter will not be influenced to a considerable extent by the pressure while, on the contrary, the first ones will be influenced and will not be able to continue from the moment when equilibrium pressure is reached. By acting upon the gaseous phase according to the invention, it is possible thus to separate completely from one another reactions which would have a tendency to proceed simultaneously if the operation were performed at ordinary pressure.

When the operation of intermixing has been effected the slag will be allowed to separate from the metal and to come to its surface and then the cover of the apparatus will be removed. At this moment the pressure returns to atmospheric pressure, the reaction equilibrium giving rise to the evolution of gas will be upset and the reaction will tend to continue, but as at this moment the slag will no longer be in a state of fine division in the metal but only in contact with it over its lower horizontal surface, the reaction will only continue in the immediate neighbourhood of this surface and will be slow. After having, if desired, removed the slag, whose composition will have changed, the metal may then be poured.

According to the invention this principle may have an immediate application in the problem of dephosphorization of cast iron.

When it is attempted to dephosphorize cast iron with the aid of a basic and oxidising slag, the following difficulty is encountered. The oxidation of the phosphorus and its absorption by the slag do not proceed without considerable parallel oxidation of the carbon; often even the dephosphorization can only proceed when the carbon content has fallen below a certain value. This is what happens in the Thomas converter where dephosphorization only becomes possible when a large part of the carbon has been eliminated, that is to say, when the cast iron is transformed into steel.

Now the reaction $P_2+5O+4CaO=P_2O_5, 4CaO$ is strongly exothermic. Its equilibrium is thus considerably displaced by a reduction of the temperature in a direction favourable to the elimination of phosphorus. It thus seems that the dephosphorization of cast iron should be effected much more readily even than that of steel. In fact, the presence of the carbon which has a tendency to combine with the oxygen to form carbon monoxide retards the progress of the dephosphorization.

Now this reaction $C+O=CO$ gives rise to carbon monoxide and the carbon-oxygen equilibruim depends on the pressure of CO above the bath. If this pressure is allowed to rise up to a value for which the carbon and oxygen present are in equilibrium the reaction will stop. At this moment, on the contrary, the dephosphorization reaction will be able to proceed without difficulty.

If a basic and oxidising slag and cast iron are put together in an apparatus of the kind mentioned above, and if the apparatus is closed and put into operation, the reaction of oxidation of the carbon by the iron oxide contained in the slag, for example, will commence from the first oscillation and the pressure of carbon monoxide in the apparatus will begin to rise. The first oscillations are preferably effected slowly so that the pressure does not rise rapidly in the apparatus. The formation of CO by oxidation of the carbon will stop when the pressure in the apparatus has attained a definite value and starting from this moment dephosphorization will take place without there being further loss of carbon. The loss of carbon will thus be limited to that which corresponds to the quantity of CO evolved inside the apparatus necessary to create the limiting pressure. This quantity will obviously be less as the limiting pressure itself is less and as the volume of the gaseous phase in the apparatus is more restricted.

In the above there has been mentioned a case of application of the apparatus in which the pressure inside the apparatus regulates itself by the fact only of the reactions taking place but it is obvious that the present invention is in no way limited to such a case and that it consists in a quite general way in regulating the composition and/or pressure of the gaseous phase in whose presence a metallurgical reaction takes place, in particular in an apparatus of the kind mentioned above so as to obtain very rapid reactions. Thus, according to the invention, there may be created inside such an apparatus a pressure which is adjustable at will as well as an atmosphere of determined composition. It is sufficient for this purpose to connect the apparatus to a pump, or to a receptacle containing under a suitable pressure the gas or gases which it is desired to introduce. The suitable atmosphere may be formed in advance inside the apparatus by passing into it a quantity of gas sufficient to drive out the air which it contains, or indeed, one may begin by introducing the metal and the slag into the apparatus and driving out the air by introduction of gas, then closing the apparatus and continuing, if necessary, to inject gas into the apparatus, which may be provided with an escape aperture to allow the excess gases or vapours which may be present to escape. One may likewise extract the gases with the aid of a suction pump.

In the attached drawing there has been shown by way of non-limiting example an apparatus capable of allowing extremely rapid reactions to be effected according to the process described above.

This apparatus comprises two chambers 1 and 2 formed by a metallic casing 3 provided with a refractory lining 4.

The assembly of the two chambers 1 and 2 is mounted upon a transverse axis 5 about which the apparatus may receive by means of any suitable known mechanism rapid alternate rocking movements projecting successively from a large height from the chamber 1 into the chamber 2 and inversely the slag and the metal, thus causing a violent intermixing of the metal and of the slag which have been represented respectively at rest in the drawing by 6 and 7.

Such an apparatus due to its extreme simplicity and to the absence of any heating element may have a very robust construction permitting it in particular to withstand relatively high pressures under which no metallurgical furnace can be caused to operate.

For the same reason, without difficulty, one may apply to it a cover with a gas-tight closure. In the example shown on the drawing the opening 8 is closed by a metallic cover 9 provided with a refractory lining 10. This closure is rendered gas-tight by a packing 11 placed out of any contact with the metal and the slag, that is to say, with any very high temperature, which ensures perfect preservation of this packing and consequently the gas-tightness of the apparatus. For this purpose, the said cover is fixed, for example, by bolts 13, on a metallic collar 12, fixed to the apparatus.

The assembly of the chambers 1 and 2 of the apparatus may be connected to a gas generator or other apparatus capable of permitting, at will, the composition of the gaseous phase inside the rocker to be varied.

The gas may be admitted, for example, through a passage inside the axis 5 of rotation of the apparatus and enter the interior of the apparatus by an aperture which is closable at will by any known suitable means in order to prevent any entry of the metal or the slag into this passage.

A safety valve 14 regulated by a spring 15 for a pressure calculated in advance permits any risk of explosion to be avoided in consequence of an accidental excessive pressure.

There will be imparted to the apparatus thus constituted the number of successive oscillations necessary to effect the reaction sought.

Apparatus of the kind described above by way of example allow, according to the invention a large number of metallurgical reactions to be effected which it would be practically impossible to effect in furnaces, and their use extends to a considerable extent the possibilities of metallurgical operations and this due to the careful combination of the two following means:

Regulation at will of the composition and of the pressure of the gaseous phase due to the use of the apparatus which is closed and connected, if desired, for example, to a gas generator, or to a suction pump;

Violent intermixing of slag and metal permitting any exterior heating to be dispensed with by reason of the very large rapidity of the reactions.

What I claim is:

In a process for desulphurising and dephosphorising cast iron by means of a basic oxidising slag, the steps of operating in a closed apparatus so as to let the pressure rise to the value at which the oxidation reaction of the carbon of the cast iron by the oxygen of the slag stops.

RENÉ PERRIN.